Patented Nov. 24, 1931

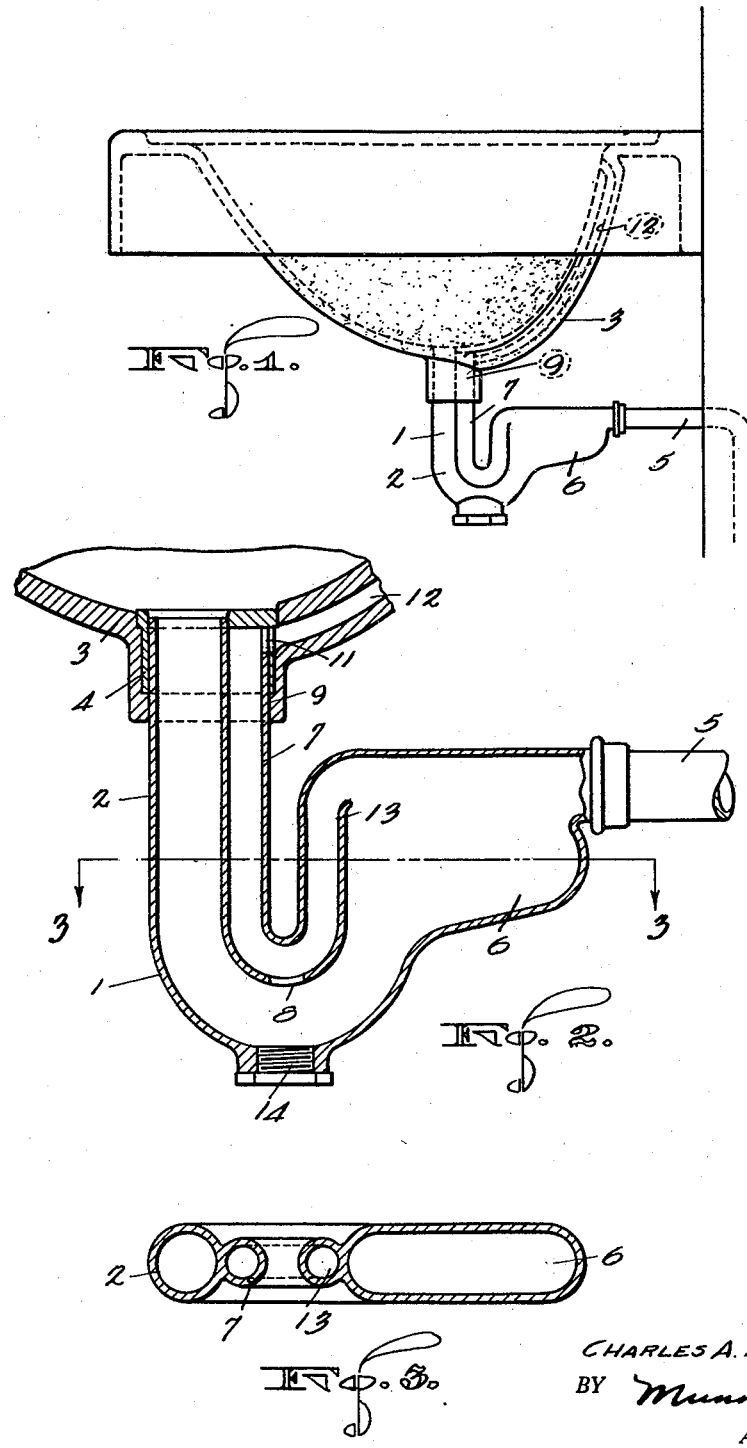

1,833,303

UNITED STATES PATENT OFFICE

CHARLES A. PRITCHARD, OF PALO ALTO, CALIFORNIA

WASTE TRAP

Application filed November 29, 1929. Serial No. 410,489.

The present invention relates to improvements in waste traps and its principal object is to provide venting means forming an integral part of the waste trap.

A further object of the invention is to provide a vent for a waste trap that is normally sealed by the waste trap sealing means, and therefore does not need connections leading to the outside of the building in which the waste trap is used.

A further object of the invention is to provide a vent for a waste trap that will insure a generous amount of sealing substance to remain in the trap at all times so as to render the seal perfect, and to prevent obnoxious gases from passing through the same.

Further objects and advantages of my invention will appear as the specification proceeds.

The preferred form of my invention is illustrated in the accompanying drawings in connection with a conventional wash basin, in which Figure 1 illustrates a side view of my trap as applied to a wash basin, Figure 2 a vertical section through the same; and Figure 3 a horizontal section taken along line 3—3 of Figure 2.

While I have shown only the preferred form of the invention, I wish to have it understood that various changes or modifications may be made within the scope of the claims hereto attached without departing from the spirit of the invention.

The trap 1 is substantially of conventional form and comprises a U-shaped pipe 2 adapted for connection to the bottom of the wash basin 3 as shown at 4, and communicating at its discharge end with the pipe 5 which may be connected to the sewer system. The discharge end of the trap is preferably enlarged to form a pocket 6 adjacent to and below the sewer pipe 5.

Formed integrally with the trap there is a U-shaped vent pipe 7 following the outlines of the trap and of considerably smaller cross section than the trap and arranged immediately above the U-shaped portion of the same and formed with a perforation 8 in the bottom thereof through which it communicates with the bottom section of the trap. One end 9 of the vent communicates with the atmosphere and preferably connects as shown at 11 with the overflow 12 of the basin. It is apparent that this end of the vent may communicate with the atmosphere in any suitable manner but it is advantageous to lead the vent pipe back to the basin so that if there should be any overflow of the vent pipe it will automatically be discharged in the basin and be returned to the system without being spilled on the floor.

The other end 13 of the vent pipe communicates with the discharge end of the trap as illustrated in the drawings, preferably above the normal level of the sealing means which may be taken to coincide with the line 3—3 of Figure 2. A plug 14 is threaded into the bottom of the trap in a conventional manner for allowing the trap to be cleaned.

The manner in which my invention operates is as follows: Normally the trap and the vent are filled with waste material substantially to the line 3—3 so as to prevent the rising of obnoxious gases through the sealing means. As additional waste material, such as water, is discharged from the basin it combines with the waste material already present and forces the same into the sewer pipe 5 whereby a vacuum is created in the discharge end of the trap, that is, in and above the pocket 6. Suction thus produced draws on the vent pipe and causes the contents of the vent pipe to be drawn out more quickly than the contents of the waste trap because the volume of water passing through the waste pipe is many times greater than that passing through the vent pipe. This action takes place with such speed that very little water enters from the trap into the vent pipe through the port 8 and the latter is emptied of liquid and allows air to be drawn therethrough for relieving the vacuum in and above the pocket 6. This breaks the siphoning effect of the flowing water and a generous amount of water remains in the trap for sealing the same. The water enters through the port hole 8 into the vent pipe until it finds its level and thereby effectively seals both the waste trap and the vent pipe.

If suction is created in or above the pocket 6 through discharge into the sewer pipe from another fixture, this suction draws the liquid from the vent pipe sooner than it draws the liquid from the trap due to the smaller area of the vent pipe, so that air may enter through the latter for relieving the vacuum. In this case the water sucked from the vent pipe does not enter the sewer pipe 5 but drops into the pocket 6 so that no water leaves the waste trap and the level of the sealing means remains the same after a corresponding amount of water has re-entered the vent pipe through the port 8.

I claim:

1. A waste trap adapted for connection into a discharge system tending to siphon out the sealing means comprising a U shaped conduit, and a U shaped vent pipe running adjacent to the same and terminating in the discharge end of the conduit.

2. A waste trap adapted for connection into a discharge system tending to siphon out the sealing means comprising a U shaped conduit, and a U shaped vent pipe running adjacent to the same and terminating in the discharge end of the conduit, and a port between the conduit and the vent pipe at the bend of the same.

3. A waste trap adapted for connection into a discharge system tending to siphon out the sealing means, comprising a U shaped conduit, a U shaped vent pipe running adjacent to and above the conduit and terminating in the discharge end of the conduit and a port connecting the conduit and the vent pipe at the bend.

4. A waste trap adapted for connection into a discharge system tending to siphon out the sealing means, comprising a U shaped conduit, a U shaped vent pipe running adjacent to and above the conduit and terminating in the discharge end of the conduit and a port connecting the conduit and the vent pipe at the bend, the conduit being formed with a pocket at its discharge end and being of larger diameter than the vent pipe.

CHARLES A. PRITCHARD.